(12) United States Patent
Kim et al.

(10) Patent No.: US 11,155,299 B2
(45) Date of Patent: Oct. 26, 2021

(54) AUTOMATIC PARKING SYSTEM AND AUTOMATIC PARKING METHOD

(71) Applicants: HYUNDAI MOTOR COMPANY, Seoul (KR); KIA MOTORS CORPORATION, Seoul (KR)

(72) Inventors: Yoon Soo Kim, Suwon-si (KR); Joo Woong Yang, Seoul (KR); Dae Joong Yoon, Hwaseong-si (KR); Eu Gene Chang, Gunpo-si (KR); Jae Seob Choi, Suwon-si (KR); Kyung Soo Ha, Pohang-si (KR); Min Byeong Lee, Seongnam-si (KR); Seung Wook Park, Yongin-si (KR); Jin Ho Park, Hwaseong-si (KR); In Yong Jung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 499 days.

(21) Appl. No.: 15/835,236

(22) Filed: Dec. 7, 2017

(65) Prior Publication Data

US 2018/0186407 A1    Jul. 5, 2018

(30) Foreign Application Priority Data

Dec. 30, 2016    (KR) ........................ 10-2016-0184297

(51) Int. Cl.
| | |
|---|---|
| *B62D 15/02* | (2006.01) |
| *G06K 9/00* | (2006.01) |
| *B60W 30/06* | (2006.01) |
| *G08G 1/16* | (2006.01) |
| *B60W 10/18* | (2012.01) |
| *B60W 10/20* | (2006.01) |

(Continued)

(52) U.S. Cl.
CPC ......... *B62D 15/0285* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS

| | | | |
|---|---|---|---|
| 2014/0105464 A1* | 4/2014 | Park ...................... | G08G 1/168 382/104 |
| 2015/0329110 A1 | 11/2015 | Stefan | |

(Continued)

FOREIGN PATENT DOCUMENTS

| | | |
|---|---|---|
| DE | 102015203619 A1 | 9/2016 |
| JP | 2007-131169 A | 5/2007 |

(Continued)

OTHER PUBLICATIONS

Office Action issued in European Patent Application No. 17 205 175.7 dated Jul. 22, 2019.

(Continued)

*Primary Examiner* — Thomas G Black
*Assistant Examiner* — Ana D Thomas
(74) *Attorney, Agent, or Firm* — Morgan, Lewis & Bockius LLP

(57) ABSTRACT

An automatic parking system includes a sensor system measuring whether there is a parking section line and positions of surrounding vehicles, and a controller configured to analyze data sensed by the sensor system to calculate parking areas around a subject vehicle, calculate a range allowing generation of a moving path based on the parking areas, provide a moving path range for a parking type that is selected among the moving path ranges provided for the at least two parking types, and an optimal parking area for the selected moving path range, and automatically park the subject vehicle in the optimal parking area.

19 Claims, 13 Drawing Sheets

(51) Int. Cl.
  *B60W 30/095* (2012.01)
  *B60Q 9/00* (2006.01)
(52) U.S. Cl.
  CPC ........ *B60W 30/06* (2013.01); *B60W 30/0956* (2013.01); *G06K 9/00812* (2013.01); *B60Q 9/004* (2013.01); *G08G 1/168* (2013.01)

(56) References Cited

U.S. PATENT DOCUMENTS

2016/0284217 A1    9/2016  Lee et al.
2018/0099661 A1*   4/2018  Bae ................... B62D 15/0285

FOREIGN PATENT DOCUMENTS

| JP | 2009-020657 A | 1/2009 |
| JP | 2012-116282 A | 6/2012 |
| JP | 2013-093013 A | 5/2013 |
| JP | 2013-241088 A | 12/2013 |
| KR | 10-2014-0075505 A | 6/2014 |
| KR | 10-1426468 B1 | 8/2014 |
| KR | 10-2015-0061422 A | 6/2015 |

OTHER PUBLICATIONS

Extended European Search Report dated May 8, 2018 issued in European Patent Application No. 17205175.7.
Korean Office Action dated Feb. 9, 2018 issued in Korean Patent Application No. 10-2016-0184297 (with English translation).

* cited by examiner

[Fig. 1]
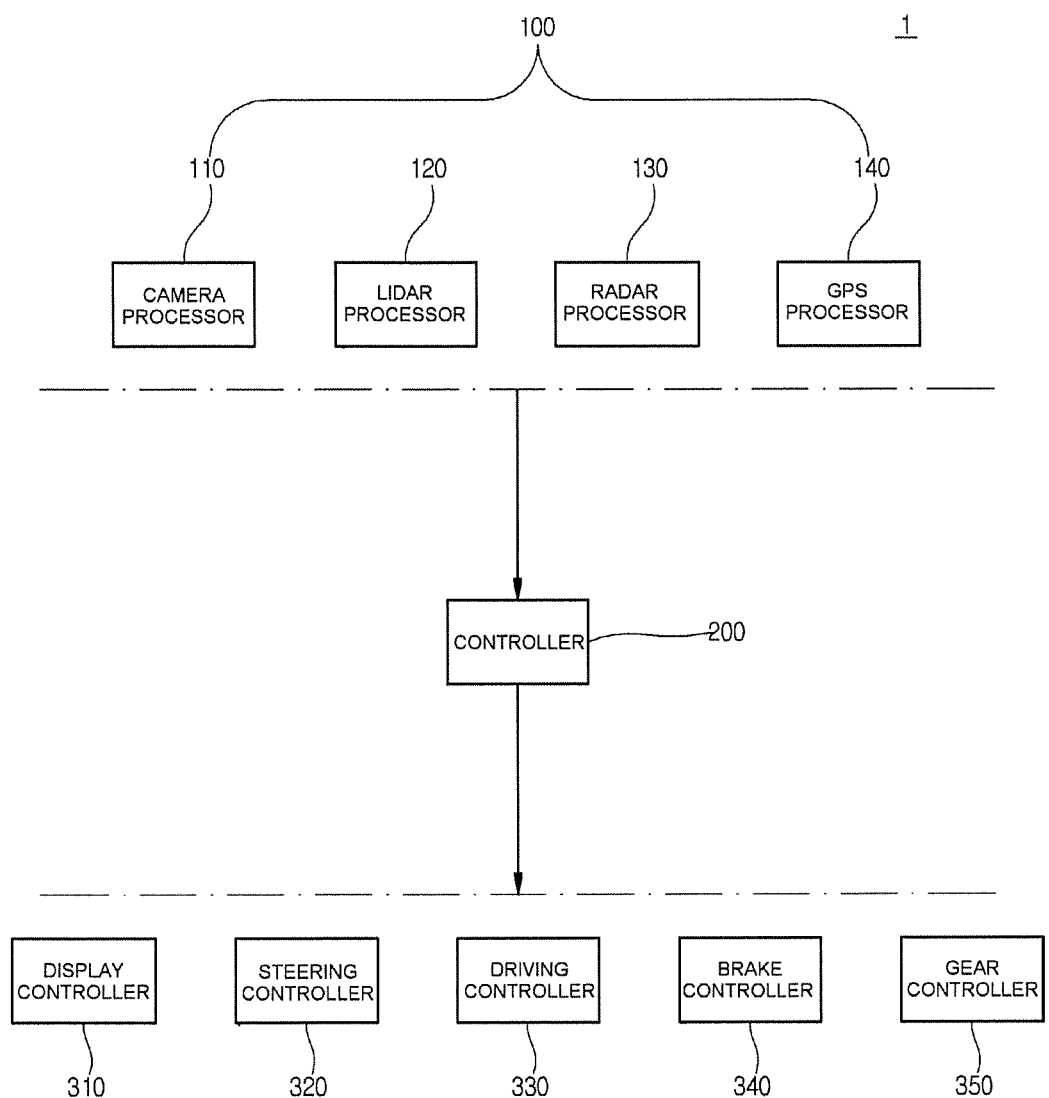

[Fig. 2]
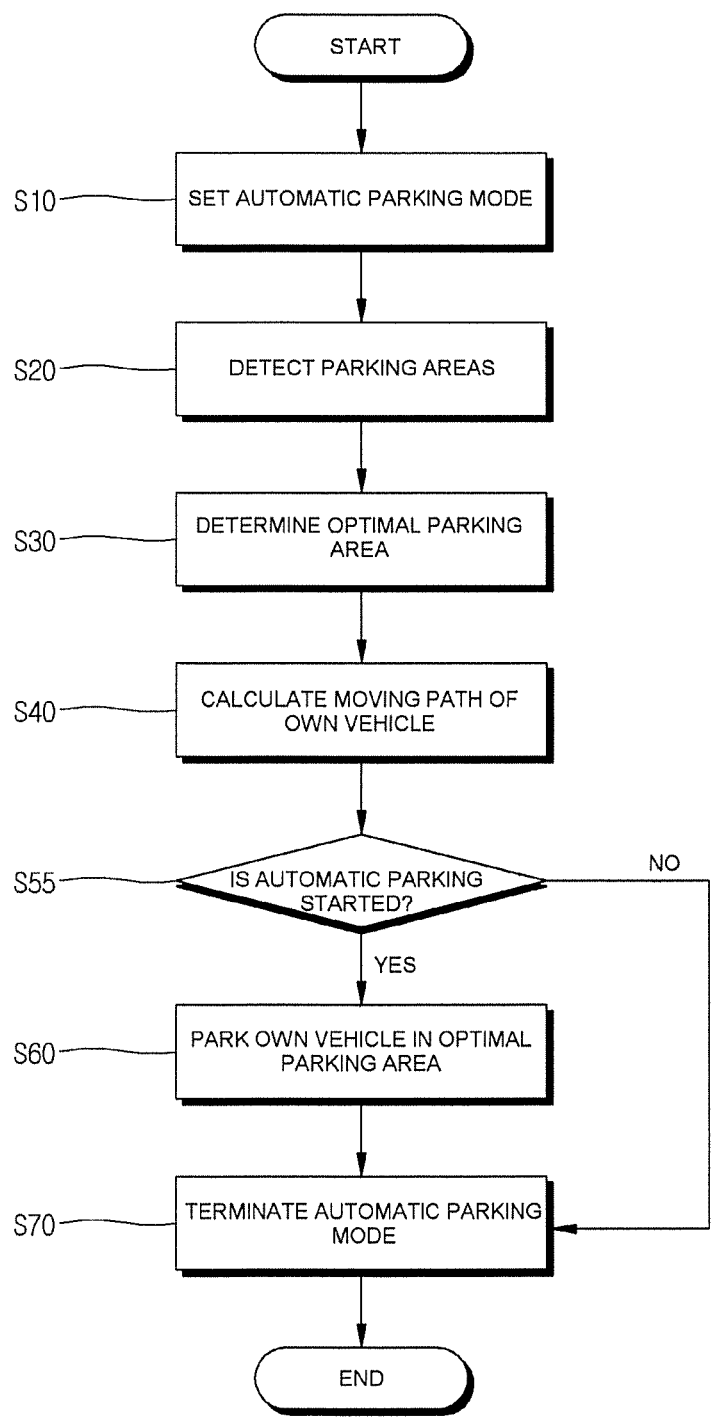

[Fig. 3]
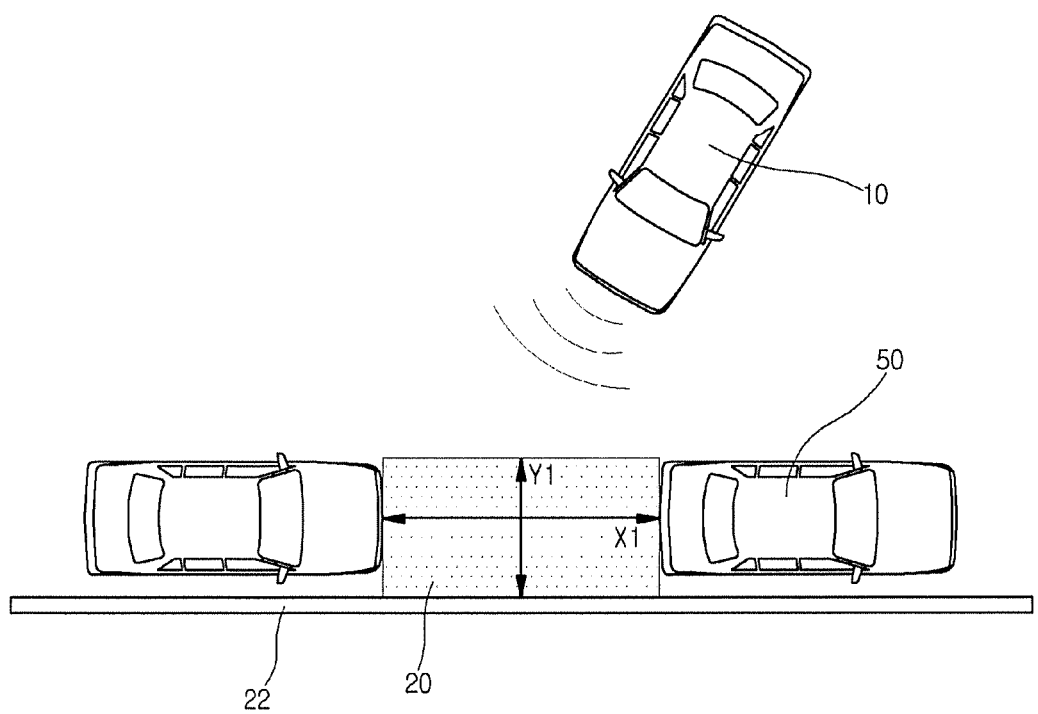

[Fig. 4]
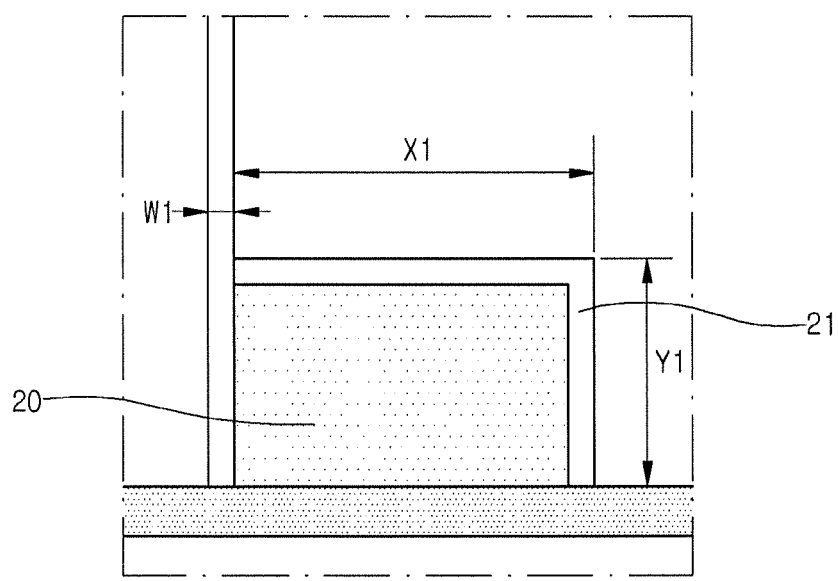

[Fig. 5]
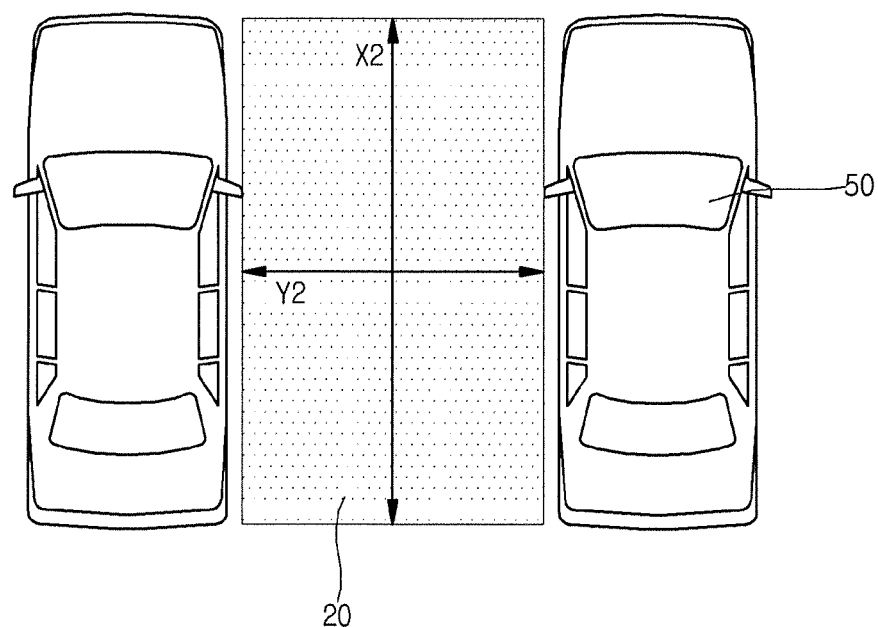

[Fig. 6]
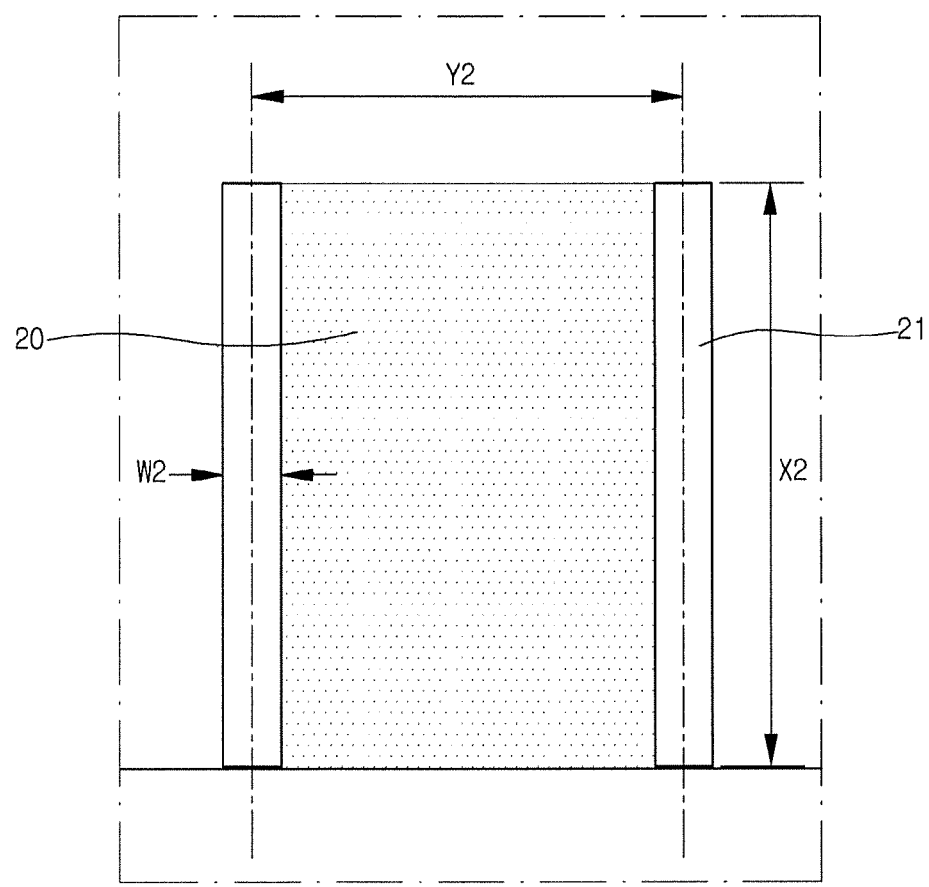

[Fig. 7]
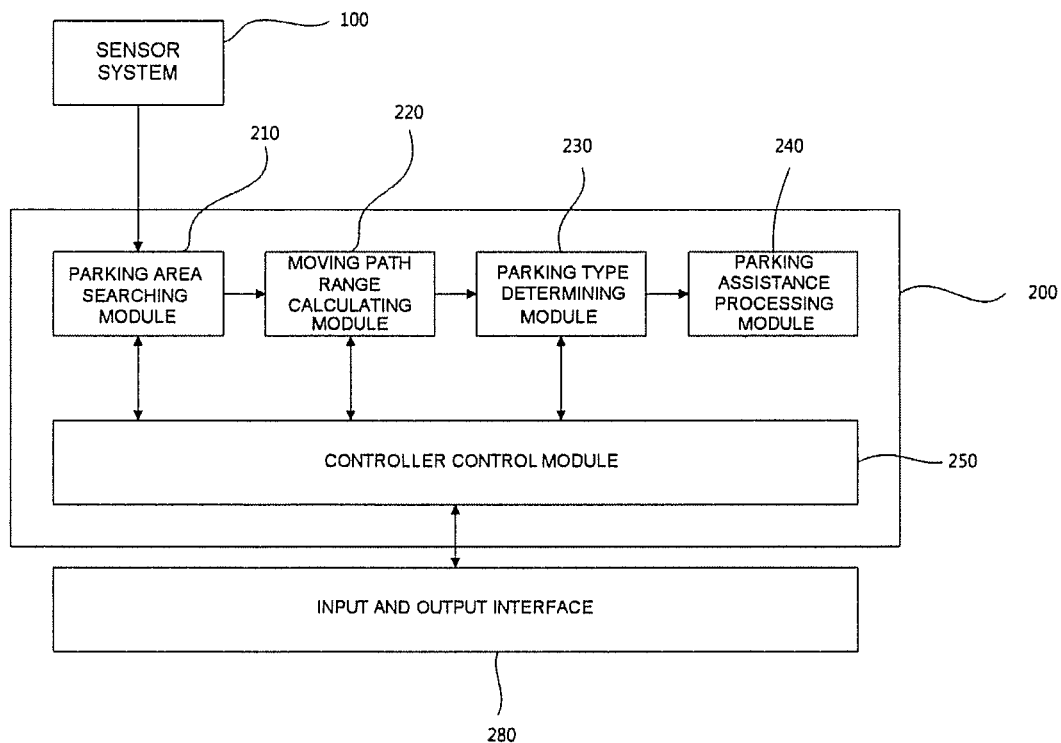
[Fig. 8a]
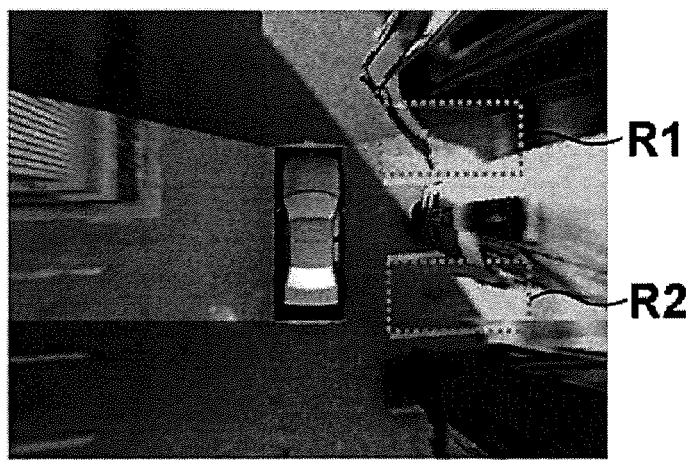

[Fig. 8b]
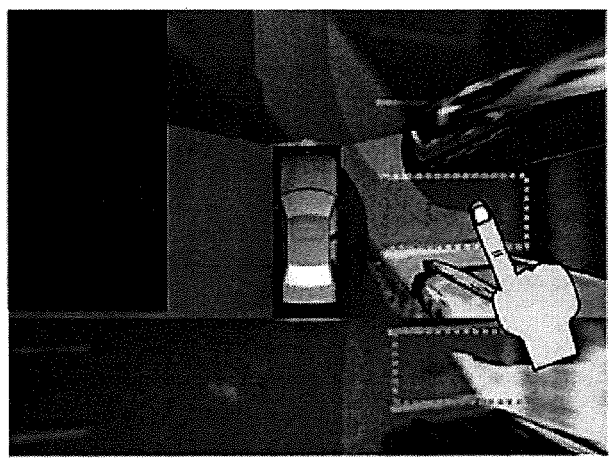
[Fig. 8c]
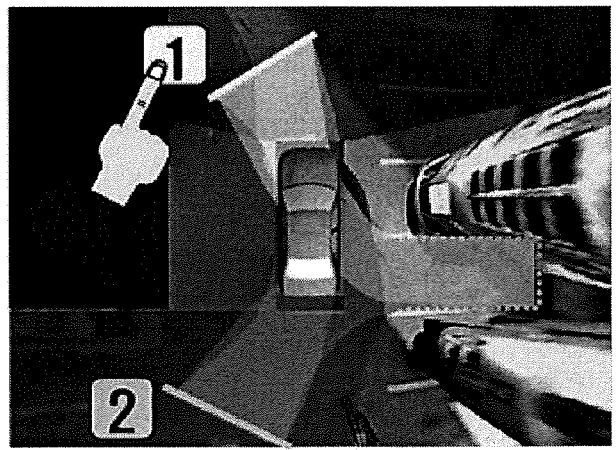

[Fig. 8d]
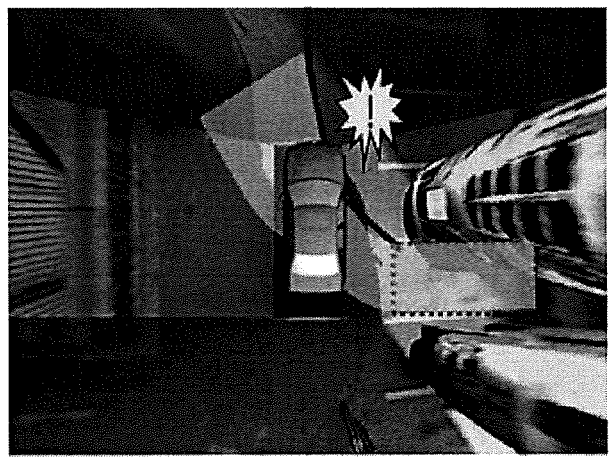
[Fig. 8e]
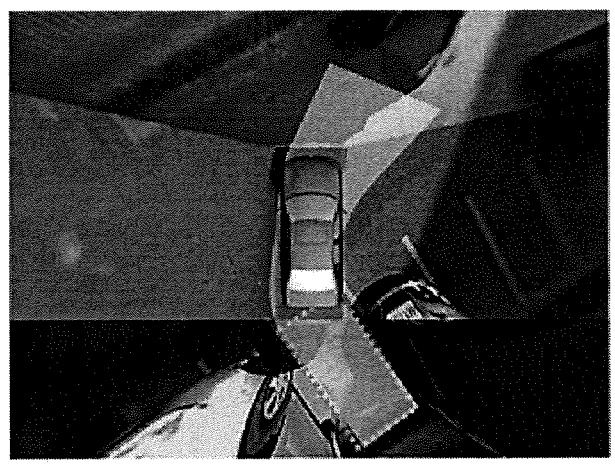

[Fig. 8f]
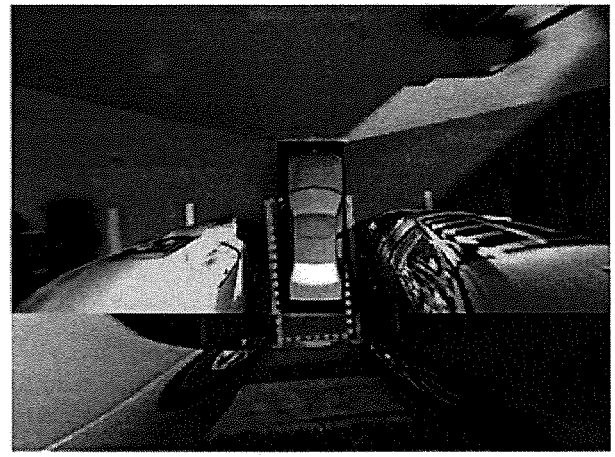
[Fig. 9a]
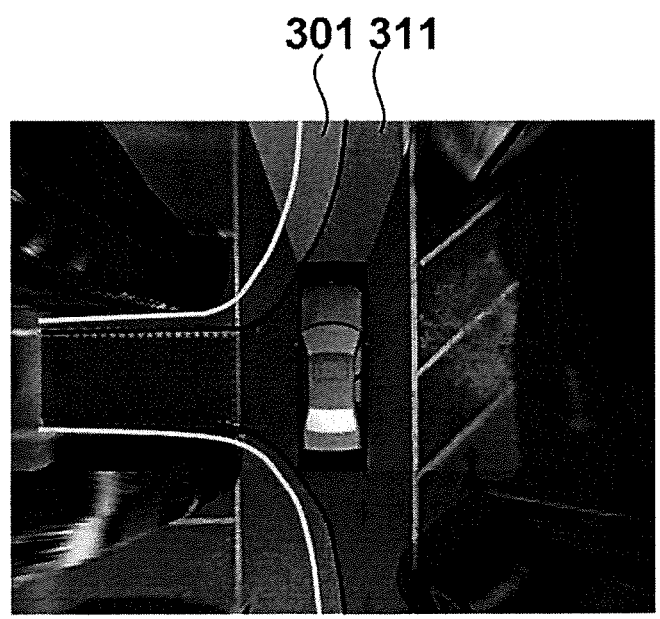

[Fig. 9b]
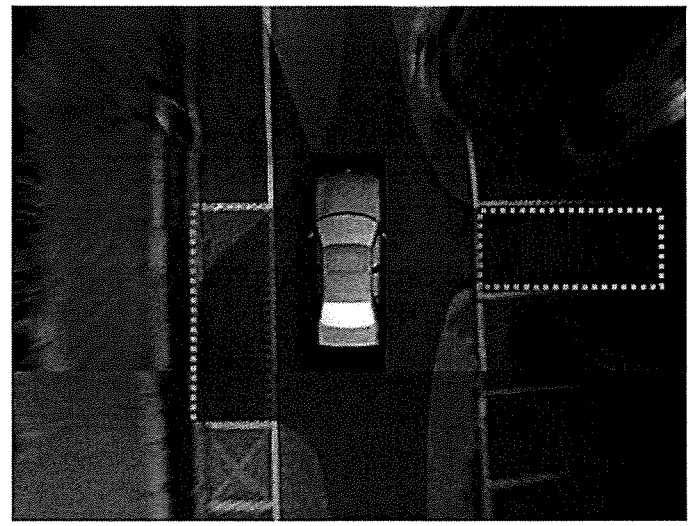
[Fig. 9c]
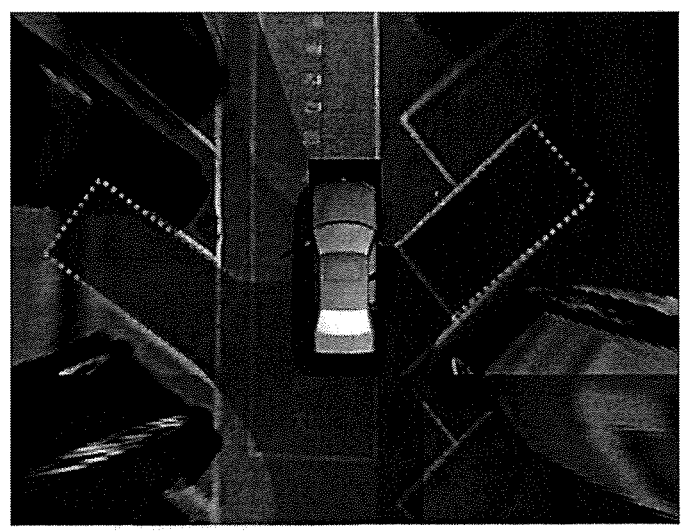

[Fig. 9d]
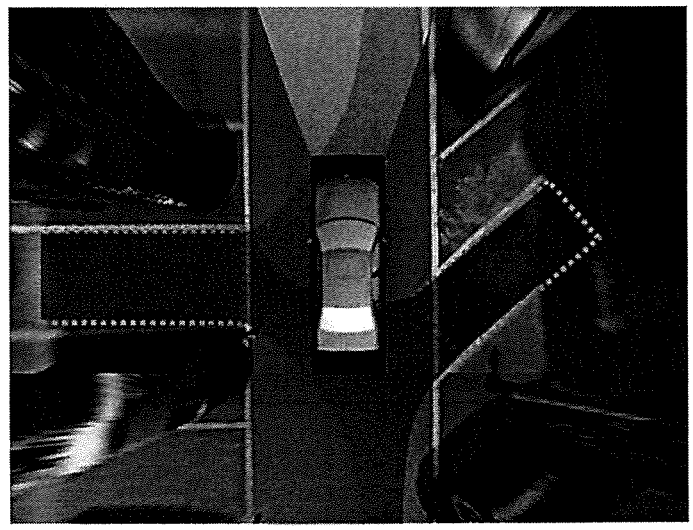

[Fig. 10]
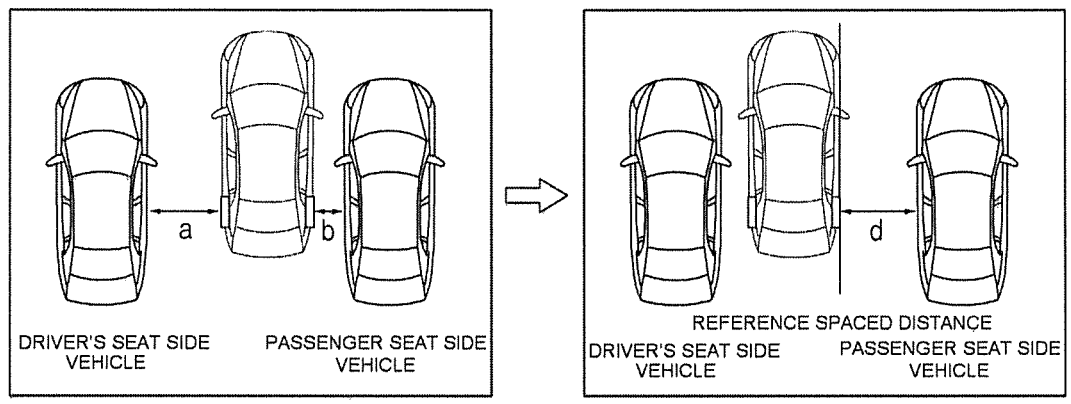
[Fig. 11]
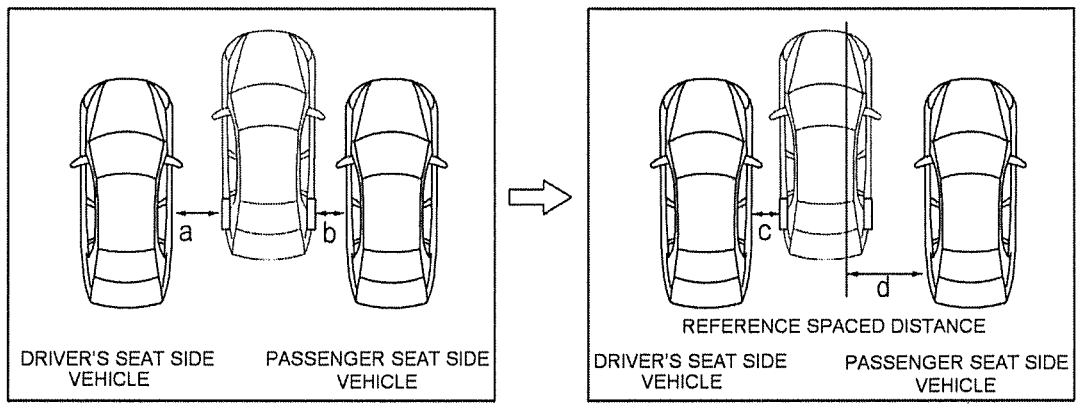

AUTOMATIC PARKING SYSTEM AND AUTOMATIC PARKING METHOD

CROSS-REFERENCE TO RELATED APPLICATION

This application is based on and claims the benefit of priority to Korean Patent Application No. 10-2016-0184297, filed on Dec. 30, 2016 with the Korean Intellectual Property Office, the entire disclosure of which is incorporated herein by reference.

TECHNICAL FIELD

Exemplary embodiments of the present disclosure relate to automatic parking, and more particularly, to an automatic parking system and an automatic parking method that use detection of a parking area.

BACKGROUND

The automatic parking system is a system capable of enabling an inexperienced driver with parking to conveniently park his/her vehicle. In the automatic parking system, when parking a vehicle, a driver determines a position of an obstacle by using a camera or an ultrasonic sensor attached to a rear portion of the vehicle, and selects parallel parking or perpendicular parking, and then the automatic parking system performs a predetermined operation.

In particular, in a case of an automatic parking system using a camera, once the driver selects a parking position while checking a rear visual field through a monitor and finally selects parking of the vehicle, the automatic parking system automatically controls a steering wheel of the vehicle using a sensor value, thereby safely parking the vehicle. Further, a parking area may be set in advance through the camera and a sensor, and the automatic parking system performs automatic parking through data obtained by the camera and the sensor. At this point, the camera may sense all of a front area, a rear area, and a side area and be implemented by around view monitoring (AVM).

In general, the AVM system provides only the function of displaying images around the vehicle to a driver, and the driver does not get help for parking because he and she directly needs to determine a parking condition from the images provided through the AVM system.

SUMMARY

An object of the present disclosure is to provide an automatic parking system that may perform automatic parking by setting an optimal parking area through a sensor, and an automatic parking method.

Another object of the present disclosure is to provide an automatic parking system that obtains an image around a vehicle using a plurality of cameras installed in the vehicle, converts the obtained image to recognize an available parking area, and provides a driver with a moving path corresponding to the parking area, and an automatic parking method.

Still another object of the present disclosure is to provide an automatic parking system and an automatic parking method capable of automatically parking a vehicle to reduce inconvenience felt due to space shortage when a driver gets into and out of subject vehicle and other vehicles after parking.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

An automatic parking system includes: a sensor system measuring whether there is a parking section line and positions of surrounding vehicles; and a controller configured to: analyze data sensed by the sensor system to calculate parking areas around a subject vehicle; calculate a range allowing generation of a moving path based on the parking areas; determine at least two parking types available at a current position of the subject vehicle in the range allowing generation of a moving path and provide moving path ranges for the at least two parking types based on a moving path estimated for each parking type, a length of the subject vehicle, a width of the subject vehicle, and a rotation angle of the subject vehicle; provide a moving path range for a parking type that is selected among the moving path ranges provided for the at least two parking types, and an optimal parking area for the selected moving path range; and automatically park the subject vehicle in the optimal parking area. The sensor system may sense spaced distances between the surrounding vehicles positioned at a side of the subject vehicle in the optimal parking area, and the controller may compare a predetermined reference distance with the spaced distances to control the subject vehicle.

The parking types may be at least two of front end parking, back-in parking, parallel parking, and diagonal parking.

The sensor system may include: a first sensor sensing presence or absence of the parking section line, and positions of surrounding vehicles; and a second sensor sensing a spaced distance between the subject vehicle and the surrounding vehicles, and the controller may calculate a range allowing generation of a moving path based on the spaced distance when the parking section line is not recognized around the subject vehicle.

The controller may control the subject vehicle so that a first spaced distance from a passenger seat side vehicle positioned on a passenger seat side of the subject vehicle is adjusted to be the predetermined reference distance based on the space distances.

The controller may adjust the first spaced distance to be the reference distance when the first spaced distance is smaller than the reference distance and then may determine whether a second spaced distance between the subject vehicle and a driver's seat side vehicle positioned on the driver's seat of the subject vehicle is equal to or greater than the reference distance.

The controller may control the subject vehicle so that the second spaced distance is the reference distance when the second spaced distance is equal to or greater than the reference distance.

The controller may control the subject vehicle so that the second spaced distance is a predetermined minimum spaced distance when the second spaced distance is less than the reference distance.

The minimum spaced distance may be set to be a distance between a main lane positioned between the subject vehicle and the driver's seat side vehicle and the subject vehicle.

The controller may determine whether a second spaced distance between the subject vehicle and a driver's seat side vehicle positioned on the driver's seat side of the subject vehicle is equal to or greater than a predetermined critical distance when the first spaced distance is smaller than the reference distance and the critical distance may be set to be a value obtained by adding a predetermined minimum spaced distance to a moving distance of the first spaced distance so that the first spaced distance is adjusted to the reference distance.

The automatic parking system may further include: a display controller informing a driver of the parking areas and moving paths corresponding to the parking areas, in which the display controller may transmit to the controller data on any one of the parking areas and the moving paths selected by the driver.

The controller may control steering, acceleration, brake, gear shift, and parking brake of the subject vehicle.

An automatic parking method for automatically parking a subject vehicle includes steps of: setting, by a driver of the subject vehicle, an automatic parking mode; sensing, by a sensor system, presence or absence of a parking section line around the subject vehicle, and positions of surrounding vehicles; analyzing, by a controller, the presence or absence of the parking section line and the positions of the surrounding vehicles to calculate parking areas around the subject vehicle; calculating, by the controller, a range allowing generation of a moving path based on the parking areas; determining, by the controller, at least two parking types available at a current position of the subject vehicle in the range allowing generation of a moving path and providing moving path ranges for the at least two parking types based on a moving path estimated for each parking type, a length of the subject vehicle, a width of the subject vehicle, and a rotation angle of the subject vehicle; providing, by the controller, a moving path range for a parking type that is selected among the moving path ranges provided for the at least two parking types, and an optimal parking area for the selected moving path range; and automatically parking, by the controller, the subject vehicle in the optimal parking area, in which the subject vehicle may be controlled by sensing spaced distances between the subject vehicle and the surrounding vehicles in the optimal parking area.

The automatic parking method may further include a step of: after the step of automatically parking the subject vehicle, terminating the automatic parking mode, in which the step of terminating the automatic parking mode may be performed by turning off an automatic parking mode switch or shifting a gear to parking.

In the step of automatically parking the subject vehicle, when an automatic parking mode switch is turned off or a gear is shifted to parking, the automatic parking mode may be terminated.

In the step of automatically parking the subject vehicle, when any one of gear shift, steering change, and brake operation is performed, the automatic parking mode may be stopped.

The spaced distances may include a first spaced distance between the subject vehicle and a passenger seat side vehicle positioned on a passenger side of the subject vehicle and a second spaced distance between the subject vehicle and a driver's seat side vehicle positioned on the driver's seat of the subject vehicle, and in the step of automatically parking the subject vehicle, the subject vehicle may be controlled so that the first spaced distance and the second spaced distance are adjusted to be a predetermined reference distance.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram showing components of an automatic parking system according to an exemplary embodiment of the present disclosure;

FIG. 2 is a flowchart showing a sequence of an automatic parking method according to an exemplary embodiment of the present disclosure;

FIG. 3 is a diagram showing a parking area at the time of parallel parking according to an exemplary embodiment of the present disclosure;

FIG. 4 is a diagram showing a parking area in a case in which there is a parking line at the time of parallel parking according to an exemplary embodiment of the present disclosure;

FIG. 5 is a diagram showing a parking area at the time of perpendicular parking according to an exemplary embodiment of the present disclosure;

FIG. 6 is a diagram showing a parking area in a case in which there is a parking line at the time of perpendicular parking according to an exemplary embodiment of the present disclosure;

FIG. 7 is a diagram showing a configuration of a controller according to an exemplary embodiment of the present disclosure;

FIG. 8A to 8F are diagrams for describing a control operation of an automatic parking system according to an exemplary embodiment of the present disclosure;

FIGS. 9A to 9D are views showing a method of calculating a moving path at the time of parking according to an exemplary embodiment of the present disclosure;

FIG. 10 is a diagram for explaining adjustment of a spaced distance at the time of automatic parking according to a second embodiment of the present disclosure; and FIG. 11 is a diagram for explaining the adjustment of the spaced distance at the time of the automatic parking according to the second embodiment of the present disclosure.

DETAILED DESCRIPTION

Hereinafter, embodiments of the present disclosure will be described in detail with reference to the accompanying drawings so that those skilled in the art may easily practice the present disclosure. However, the present disclosure may be implemented in various different forms and is not limited to the embodiments provided in the present description.

Portions unrelated to the description are omitted in order to obviously describe the present disclosure, and components that are the same as or similar to each other will be denoted by the same reference numerals throughout the specification.

A case in which any one part is "connected" with the other part includes a case in which the parts are "directly connected" with each other and a case in which the parts are "electrically connected" with each other with other elements interposed therebetween. In addition, unless explicitly described to the contrary, "comprising" any components will be understood to imply the inclusion of other elements rather than the exclusion of any other elements.

When it is described that any one part is "on" the other part, it may mean that the part is directly on the other part or any other part is interposed therebetween. On the contrary, when it is described that any one part is "directly on" the other part, there is no other part interposed therebetween.

Terms "first", "second", "third", and the like are used to describe various parts, components, areas, layers, and/or sections, but are not limited thereto. These terms are used only to distinguish one part, component, area, layer, or section from another part, component, area, layer, or section. Accordingly, a first part, a first component, a first area, a first layer, or a first section to be described below may indicate a second part, a second component, a second area, a second layer, or a second section without departing from the scope of the present disclosure.

Technical terms used herein are merely to describe a specific embodiment, but are not intended to limit the present disclosure. Singular forms used herein include plural forms unless context clearly indicates otherwise. A term "comprising" used in the specification specifies a specific characteristic, area, integer, step, operation, element, and/or component, but does not exclude a presence or an addition of any other characteristic, area, integer, step, operation, element, and/or component.

Terms "below", "above", and the like indicating a relative space may be used to more easily describe a relationship between one part with another part illustrated in the drawings. These terms are intended to include other meanings or operations of a device that is being used, in addition to meanings intended in the drawings. For example, when the device in the drawing is inverted, any part described as being "below" other parts may be described as being "above" the other parts. Therefore, the exemplary term "below" includes both of an upper direction and a lower direction. The device may rotate by 90° or other angles, and the terms indicating a relative space are interpreted according thereto.

Although not defined otherwise, all terms including technical terms and scientific terms used herein have the same meanings as those generally understood by a person having ordinary knowledge in the art to which the present disclosure pertains. Terms defined in a dictionary generally used are additionally interpreted as having a meaning consistent with the related art documents and contents currently disclosed, and unless defined otherwise, are not interpreted as having an ideal or very official meaning.

Hereinafter, embodiments of the present disclosure will be described in detail with reference to the accompanying drawings so as to be easily practiced by a person having ordinary knowledge in the art to which the present disclosure pertains. However, the present disclosure may be implemented in various different forms and is not limited to the embodiments provided in the present description.

FIG. 1 is a diagram showing components of an automatic parking system according to an exemplary embodiment of the present disclosure.

Referring to FIG. 1, an automatic parking system 1 may be implemented through connection among a processor level, an electrical control unit (ECU) level, and a controller level. Data sensed at the processor level may be transmitted to the ECU level, and the ECU level may control the controller level through the sensed data.

An MCU level may include a sensor system 100, which may include a camera processor 110, a Lidar processor 120, a radar processor 130, and a GPS processor 140.

The camera processor 110 may sense a front area, a rear area, and/or a side area of a subject vehicle, and transmit data obtained therethrough to the ECU level. The camera processor 110 may largely include an image sensor, an image processor, and a camera MCU. As an example, the image sensor may sense an image of a subject photographed through a lens, the image processor may receive the sensed data from the image sensor and process the received data, and the camera MCU may receive the processed data from the image processor. For example, the data received by the camera MCU may include data on a preceding vehicle, data on a forward lane, data on a preceding cyclist, data on a traffic sign, data on active high beam control (AHB), data on wheel detection (e.g., data for more rapidly recognizing a vehicle through vehicle wheel recognition with respect to a close cut-in vehicle that comes into a field-of-view (FOV) of a camera), data on a traffic light, data on road marking (e.g. arrow on road), data on vehicle detection (VD) at any angle (data for recognizing a vehicle with respect to all driving directions or angles of the preceding vehicle), data on road profile (e.g., data for improving riding quality through suspension control by recognizing a shape of forward road (unevenness, a speed bump, or a hole)), data on semantic free space (e.g., boundary labeling), data on a general object (neighboring vehicle, etc.), data on advanced path planning (e.g., data for predicting a vehicle driving path by deep learning through surrounding environment even on a road without lane or a contaminated road), data on odometry (e.g., data for combination with recognition information of GPS by recognizing a landmark on a driving road), data on a parking line and data on an interval between vehicles for parking, etc.

The Lidar processor 120 may be connected to a Lidar device which is a sensor, and the Lidar device may sense a front area, a rear area, and a side area of the vehicle. The Lidar device may be configured of a laser transmission module, a laser detection module, a signal collection and processing module, and a data transmission and reception module, and as a light source of a laser, laser light sources with a wavelength in a wavelength range of 250 nm to 11 μm or with variable wavelength may be used. Further, the Lidar device may be classified into a time of flight (TOP) type and a phase shift type according to a signal modulation scheme.

The radar processor 130 may be connected to a radar device which is a sensor to sense an object in the front area, the rear area, and the side area of the vehicle. The radar device may be a sensor device using an electromagnetic wave to measure a distance, a speed, or and angle of an object. When using the radar device, it is possible to sense an object within 150 m in a horizontal angle range of 30 degrees by using a scheme of a frequency modulation carrier wave (FMCW), or a pulse carrier. The radar processor 130 may process data sensed and output by the radar device, and this processing may include magnification of the sensed forward object and focusing on an area of the object in the entire view area.

The GPS processor 140 is connected to a GPS device which is a sensor to measure a current position of the vehicle. The GPS device may be a device that may measure a position and a speed of the vehicle and time by communication with a satellite. Specifically, the GPS device may measure a delay time of a radio wave emitted from the satellite, and obtain the current position based on a distance from the satellite orbit.

A controller 200 is an electrical control unit (ECU) belonging to the ECU level, and may be a device integrally controlling multiple electronic devices used in a vehicle. For example, the controller 200 may control all of processors belonging to the processor level and controllers belonging to the controller level. The controller 200 may receive sensing data from the processors, generate a control command controlling a controller in consideration of circumstances, and transmit the control command to the controllers. In the present specification, for convenience of explanation, the ECU level is described as a higher level than the processor level, however, there may be a case in which one of the processors belonging to the processor level serves as an ECU, or a case in which two processors are combined to serve as an ECU.

The controller level may include a display controller 310, a steering controller 320, a driving controller 330, a brake controller 340, and a gear controller 350. Each of the controllers may control components of a vehicle based on the control command received from the controller 200.

The display controller 310 may be configured to provide the driver with information on a specific situation or to warn of dangerous situation. The display controller 310 may generate an audio signal, a video signal, or a haptic signal for warning of driving situation of the vehicle and dangerous situation. For example, the display controller 310 may output situation explanation and a warning sound in an audio way, and output a message about the situation or a warning message through an HUD display or a side mirror display. Alternatively, the display controller 310 may operate a vibration motor mounted in a handle to generate warning vibration.

The steering controller 320 may perform a control for a motor driving power steering (MDPS) system driving a steering wheel. For example, when collision of the vehicle is expected, the steering controller 320 may control a steering of the vehicle in a direction in which the collision may be avoided or a damage may be minimized.

The driving controller 330 may perform deceleration, acceleration, on/off of an engine to drive the vehicle. For example, the driving controller 330 may perform deceleration when collision is expected at the time of driving the vehicle, and perform on/off of the engine at the start or end of the driving of the vehicle according to the control command of the controller 200.

The brake controller 340 may control whether to operate a brake of the vehicle, and control a pedal effort of the brake. For example, when front collision is expected, the brake controller 340 may perform a control to automatically operate an emergency brake according to the control command of the controller 200 regardless of whether or not the driver operates the brake.

Meanwhile, hereinabove, the processors, the ECUs, and the controllers are described as independent components with reference to the accompanying drawings, but it is to be understood that the present disclosure is not necessarily limited thereto. Two or more processors may be integrated as one processor and may work in conjunction with each other, two or more processors and an ECU may be integrated as one device, two or more controllers may be integrated as one controller and may work in conjunction with each other, two or more controllers and an ECU may be integrated as one device.

FIG. 2 is a flowchart showing a sequence of an automatic parking method according to an exemplary embodiment of the present disclosure. The automatic parking system according to an exemplary embodiment of the present disclosure means a partially automated parking system (PAPS).

Referring to FIG. 2, the driver may set an automatic parking mode provided in the vehicle. By setting the automatic parking mode, a vehicle mode may be changed from a standby mode to an active mode in which automatic parking may be performed. A method of setting the automatic parking mode may include a first type method in which the driver executes the automatic parking mode while sitting on a driver's seat, and a second type method in which the driver executes the automatic parking mode outside the vehicle or while sitting on a seat other than the driver's seat by using a remote controller (S10). The sensor system 100 may sense the surrounding area of the subject vehicle to calculate a plurality of parking areas in which the subject vehicle may be parked. The sensor system 100 may sense parking lines, curbs disposed near the parking lines, an empty space between surrounding vehicles, etc. At this point, the controller 200 may calculate parking areas by considering a length and a width of the subject vehicle (S20). The controller 200 may display to the driver data on the calculated parking areas through the display controller. The driver may select a parking area that is determined as an optimal parking area through a display device or a separate switch in the vehicle (the first type method), or may select a parking area that is determined as an optimal parking area by using a remote controller (the second type method). At this point, the controller 200 may recommend to the driver a parking area that is determined as an optimal parking area among the parking areas (S30). When an optimal parking area is determined, the controller 200 may calculate a moving path between a current position and the optimal parking area. A detailed method for calculating the moving path will be described below (S40). The controller 200 may drive the subject vehicle based on the moving path. The controller 200 may automatically drive the subject vehicle, and control the steering controller, the driving controller, the brake controller, and the gear controller. At this point, the controller 200 may control the subject vehicle at a speed of less than 10 km/h, and control deceleration or acceleration of the vehicle, gear change, braking and parking braking, etc. The sensor system 100 may sense a distance from an obstacle during automatic parking of the subject vehicle, and the controller 200 may determine possibility of collision based on the distance between the subject vehicle and the obstacle and inform the driver of the determined possibility. The sensor system 100 may include at least one of a camera device capable of sensing a distance between the subject vehicle and an obstacle, a Lidar device, and a radar device. The driver may select whether to perform automatic parking. When the driver executes the automatic parking, the controller 200 may automatically control the subject vehicle to park the subject vehicle in an optimal parking area, and when the driver dose not execute the automatic parking, the driver may directly park the subject vehicle in the optimal parking area. If the driver turns off an execution switch of the automatic parking mode or shift the gear to parking (P) during the automatic parking, the subject vehicle may stop. At this point, the controller 200 may request the driver to select whether to maintain the automatic parking mode through the display controller. Based on an intention of the driver, the automatic parking mode may be executed again or terminated. Further, when the gear is shifted to another gear other than parking (P) during the automatic parking, and when the steering is changed to a predetermined degree or more, the vehicle may stop. For example, steering change of a predetermined degree may mean a case in which about 5 Nm of torque is applied to the steering wheel. At this point, the controller 200 may request the driver to select whether to maintain the automatic parking mode through the display controller. Based on an intention of the driver, the automatic parking mode may be executed again or terminated. Further, when the braking is performed to a predetermined degree or more during the automatic parking, the controller 200 may determine that the braking of the driver should be preferentially performed, rather than application of the automatic parking system. That is, the subject vehicle may stop by the brake (S55 and S60). In addition, the automatic parking mode may be terminated following the intention of the driver. The driver may turn off the execution switch of the automatic parking mode (the first type) or cancel the execution of the automatic parking mode by using the remote controller (the second type) (S70).

FIG. 3 is a diagram showing a parking area at the time of parallel parking according to an exemplary embodiment of the present disclosure, and FIG. 4 is a diagram showing a parking area in a case in which there is a parking line at the time of parallel parking according to an exemplary embodiment of the present disclosure.

Referring to FIGS. 3 and 4, it is possible to detect parking areas in which parallel parking may be made through the sensor system 100 attached to a subject vehicle 10. The sensor system 100 may detect a parking line 21, a curb 22 disposed around parking areas, and a space between surrounding vehicles 50, and the controller 200 may calculate parking areas by calculating whether the spaces are a space in which the subject vehicle 10 may be parked based on such information. The controller 200 may calculate an optimal parking area 20 that is most suitable for parking among parking areas. The controller 200 may select an optimal parking area 20 by considering a length and a width of the subject vehicle 10.

Referring to FIG. 3, the controller 200 may calculate the optimal parking area 20 by calculating a space between surrounding vehicles 50. The curb 22 may assist in defining a space between surrounding vehicles 50. Further, the sensor system 100 may sense an alignment line of the surrounding vehicles 50 parked in parallel to assist in calculating the optimal parking area 20. The optimal parking area 20 may have a length X1 extending in a direction in which the surrounding vehicles 50 are parked, and a width Y1 extending in a direction perpendicular to that of the length X1. The length X1 may be a value obtained by adding a length of the subject vehicle 10 and first room (+a), and the width Y1 may be a value obtained by adding a width of the subject vehicle 10 and second room (+b). For example, when the length of the subject vehicle 10 is short (4 m or less), the first room (+a) may satisfy +a=4 m×0.25, when the length of the subject vehicle 10 is long (6 m or more), the first room (+a) may satisfy +a=6 m×0.25, and the second room (+b) may be 0.2 m. That is, the controller 200 may calculate the optimal parking area 20 by considering the length and the width of the subject vehicle 10.

Referring to FIG. 4, the sensor system 100 may sense the parking line 21, and the controller 200 may determine whether the subject vehicle 10 may be parked by calculating a length X1 and a width Y1 of the parking line 21. The parking line 21 may have a contrast range of at least 5. The parking line 21 may have a constant width W1, and the controller 200 may determine whether it is an optimal parking area 20 by considering the length X1, the width Y1, and the width W1 of the parking line 21.

FIG. 5 is a diagram showing a parking area at the time of perpendicular parking according to an exemplary embodiment of the present disclosure, and FIG. 6 is a diagram showing a parking area in a case in which there is a parking line at the time of perpendicular parking according to an exemplary embodiment of the present disclosure.

Referring to FIGS. 5 and 6, it is possible to detect parking areas in which perpendicular parking may be made through the sensor system 100 attached to the subject vehicle. The sensor system 100 may detect a parking line 21 and a space between surrounding vehicles 50, and the controller 200 may calculate parking areas by calculating whether the spaces are a space in which the subject vehicle may be parked based on such information.

Referring to FIG. 5, the controller 200 may calculate the optimal parking area 20 by calculating a space between surrounding vehicles 50. The optimal parking area 20 may have a width Y2 extending in a direction in which the surrounding vehicles 50 are parked, and a length 2 extending in a direction perpendicular to that of the width Y2. The length X2 may be similar to the length of the subject vehicle, and the width Y2 may correspond to a value obtained by adding the width of the subject vehicle and third room (+c). For example, the third room (+c) may be 1.2 m.

Referring to FIG. 6, the sensor system 100 may sense the parking line 21, and the controller 200 may determine whether the subject vehicle 10 may be parked by calculating a length X2 and a width Y2 of the parking line 21. The parking line 21 may have a contrast range of at least 5. The parking line 21 may have a constant width W2, and the controller 200 may determine whether it is an optimal parking area 20 by considering the length X2, the width Y2, and the width W2 of the parking line 21. For example, when the subject vehicle is a large vehicle, the length X2 may be longer than the length of the subject vehicle by 1.0 m, and the width Y2 may be longer than the width of the subject vehicle by 0.06 m. That is, the controller 200 may calculate the optimal parking area 20 by considering the length and the width of the subject vehicle 10.

FIG. 7 is a diagram showing a configuration of a controller 200 according to an exemplary embodiment of the present disclosure.

Referring to FIGS. 1 and 7, the controller 200 according to the exemplary embodiment of the present disclosure includes a parking area searching module 210, a moving path range calculating module 220, a parking type determining module 230, a parking assistance processing module 240, and a controller control module 250. An input and output interface 280 may receive a signal from the controller control module 250 to provide information to the driver. The input and output interface 280 may be a component of the display controller 310.

The controller 200 performs various functions of following modules 210, 220, 230, 240 and 250. The modules 210, 220, 230, 240 and 250 described below are implemented with software instructions executed on the controller 200.

The parking area searching module 210 may receive an image of a surrounding area of the vehicle and data on a spaced distance between the subject vehicle and the surrounding vehicles from the sensor system 100 provided in the vehicle. Here, the parking area searching module 210 may also receive an around view monitoring (AVM) image from an AVM system. Hereinafter, a case in which an input image is an AVM image will be assumed and described. The parking area searching module 210 analyzes the AVM image and the data on the spaced distance to search a plurality of parking areas around the vehicle. The parking area searching module 210 transmits a searched result of the parking areas to the moving path range calculating module 220 and the controller control module 250. The controller control module 250 may control the display controller 310 to output the searched result of the parking areas input from the parking area searching module 210 to the input and output interface 280 such as a touch screen. The input and output interface 280 may display the parking areas for the driver. The driver may select an optimal parking area among the parking areas displayed on the input and output interface 280. At this point, the number of optimal parking areas may be plural. The controller control module 250 may output a control signal to the controllers to drive the subject vehicle when the optimal parking area is determined through the input and output interface 280. As an example, the parking area searching module 210 may be a component of the sensor system 100, and as another example, the parking area searching module 210 may be a component analyzing data measured by the sensor system 100.

When the control signal is input from the controller control module 250, the moving path range calculating module 220 may calculate a range allowing generation of a moving path based on an optimal parking area selected among the searched parking area information input from the parking area searching module 210. Here, once the driver selects an optimal parking area, the moving path range calculating module 220 may receive only information on the optimal parking area from the parking area searching module 210. The moving path range calculating module 220 may provide an entire range allowing generation of a moving path from the current position of the subject vehicle to the optimal parking area in the AVM image.

The moving path range calculating module 220 may recognize a parking section line (parking line) around the vehicle that is obtained through the sensor system 100, and calculate a range allowing generation of a moving path based on the recognized parking section line. If there are other vehicles around the vehicle, the moving path range calculating module 220 may calculate a range allowing generation of a moving path by considering the recognized parking section line and all other data. Meanwhile the moving path range calculating module 220 may also calculate a range allowing generation of a moving path based on other data when the parking section line around the vehicle is not recognized in the AVM image. The moving path range calculating module 220 may transmit the calculated result about the range allowing generation of a moving path to the controller control module 250 such that the calculated result is displayed through the input and output interface 280. Further, the moving path range calculating module 220 may transmit information on the calculated range allowing generation of a moving path to the parking type determining module 230.

The parking type determining module 230 may determine, based on information on a range allowing generation of a moving path that is input from the moving path range calculating module 220, a parking type available within the range allowing generation of a moving path. As an example, the parking type determining module 230 may determine a parking type available at a current position of the vehicle within a range allowing generation of a moving path, such as front end parking, back-in parking, parallel parking, diagonal parking, etc. Further, the parking type determining module 230 may estimate a moving path for each parking type available within the range allowing generation of a moving path, and calculate a moving path range based on each estimated moving path. The parking type determining module 230 may calculate a moving path range by reflecting information on a length, a width, a rotation angle, and the like of the vehicle. The parking type determining module 230 may transmit information on a moving path range for each parking type to the parking assistance processing unit 240. The parking type determining module 230 may transmit information on a moving path range for each parking type to the controller control module 250 such that the transmitted information is displayed through a screen of the input and output interface 280.

The driver may confirm the moving path range for each parking type through the screen of the input and output interface 280, and select a moving path range for a desired parking type among moving path ranges for each parking type displayed on the screen of the input and output interface 280. At this point, the controller control module 250 may output a control signal to the parking assistance processing unit 240 when information on a selection of the desired moving path range is input through the input and output interface 280.

Meanwhile, when the control signal is input from the controller control module 250, the parking assistance processing unit 240 may output to the controller control module 250 parking assistance information according to a current position of the vehicle based on the moving path range for the parking type selected among the moving path ranges for each parking type input from the parking type determining module 230. In this case, the controller control module 250 controls the parking assistance information input from the parking assistance processing unit 240 to be displayed through the screen of the input and output interface 280. The parking assistance processing unit 240 may output information for inducing change of a position of the vehicle to the desired moving path range and may output information such as a stop timing and a shift timing.

FIGS. 8A to 8F are diagrams for describing a control operation of an automatic parking system according to an exemplary embodiment of the present disclosure. Specifically, FIGS. 8A to 8F show screens of the input and output interface implemented according to an operation of the automatic parking system.

Referring to FIGS. 8A to 8F, the automatic parking system uses an AVM image and a sensor measurement value to search parking areas around the subject vehicle 10. When the parking areas are searched, the automatic parking system displays parking spaces R1 and R2 searched based on a position of the subject vehicle 10 through the screen as in FIG. 8A. At this point, the driver may select an optimal parking area that is a space most suitable for parking. When the optimal parking area is selected as in FIG. 8B, the automatic parking system may calculate a range allowing generation of a moving path based on the selected target parking space and display the calculated range through the screen of the input and output interface. Thereafter, the automatic parking system calculates a moving path range for each parking type available within the range allowing generation of a moving path to display ① and ② which are moving path ranges for each parking type through the screen of the input and output interface as in FIG. 8C.

At this point, the driver may select any one moving path range according to a parking type of ① and ②. As an example, the driver may select a moving path range by touch one portion of the screen of the input and output interface.

If the moving path range of ① is selected, the automatic parking system may display parking assistance information varied according to change of the position of the subject vehicle 10 through the screen of the input and output interface screen as in FIGS. 8D to 8F, and when the subject vehicle 10 deviates from a parking trajectory range of ①, may give an alarm or allow automatic control of the steering wheel.

FIGS. 9A to 9D are views showing a method of calculating a moving path at the time of parking according to an exemplary embodiment of the present disclosure.

FIG. 9A shows an example of setting a range allowing generation of a moving path, and shows a first reference range 301 calculated by a space between surrounding vehicles measured by the sensor system 100, and a second reference range 311 calculated by a parking section line measured by the sensor system 100. As an example, the automatic parking system may set the reference range to be different depending on presence or absence of a parking section line and presence or absence of other vehicle around the subject vehicle. The first reference range 301 may be wider or narrower than the second reference range 311.

FIG. 9B shows ranges allowing generation of a moving path in a case in which a parking area in a vertical direction and a parking area in a horizontal direction based on a moving direction of the vehicle are searched. The automatic parking system may calculate each of the range allowing generation of a moving path for the parking area in the vertical direction and the range allowing generation of a moving path for the parking area in the horizontal direction.

FIG. 9C shows ranges allowing generation of a moving path in a case in which a parking area in a left diagonal direction and a parking area in a right diagonal direction based on the moving direction of the vehicle are searched. The automatic parking system may calculate each of the range allowing generation of a moving path for the parking area in the left diagonal direction and the range allowing generation of a moving path for the parking area in the right diagonal direction.

FIG. 9D shows ranges allowing generation of a moving path in a case in which a parking area in the vertical direction and a parking area in the right diagonal direction based on the moving direction of the vehicle are searched. The automatic parking system may calculate each of the range allowing generation of a moving path for the parking area in the vertical direction and the range allowing generation of a moving path for the parking area in the right diagonal direction.

As described above, when parking areas around the vehicle are searched from the AVM image, the automatic parking system may calculate ranges allowing generation of a moving path for the searched parking areas. At this point, when a target parking area is selected by a user, a range allowing generation of a moving path for the selected optimal parking area may be displayed through the screen of the input and output interface.

FIG. 10 is a diagram for explaining adjustment of a spaced distance at the time of automatic parking according to a second embodiment of the present disclosure. The driver's seat side distance a means a spaced distance between the subject vehicle and surrounding vehicles positioned on a driver's seat side of the subject vehicle and a passenger seat side distance b means a distance between the subject vehicle and the surrounding vehicles positioned on the passenger seat side.

Referring to FIGS. 1 and 10, when the subject vehicle enters the optimal parking area, the spaced distance between the subject vehicle and the surrounding vehicles may be adjusted. If the extracted passenger side distance b is smaller than the predetermined reference distance d when the subject vehicle enters the optimal parking area, it is determined that the space is not sufficient and if the driver's seat side distance a is enough to meet the reference distance d after a parking space with respect to the passenger seat side distance b is secured, a control to secure a spare space may be performed. The sensor system 100 may measure the distance between the subject vehicle and vehicles positioned on both sides of the subject vehicle, and the controller 200 may compare measure the distance between the subject vehicle and vehicles positioned on both sides of the subject vehicle based on the data acquired by the sensor system 100. On the other hand, when the driver's seat side distance a is not sufficient, a control to secure the minimum spaced distance may be performed.

That is, as in the present embodiment, the conditions under which the control to secure a spare space is performed are that the spaced distance between the vehicle and the passenger side vehicle is smaller than the reference distance (b<d) and the spaced distance between the vehicle and the passenger side vehicle is adjusted to be reference distance and then the spaced distance between the vehicle and the driver's seat side vehicle positioned on the driver's side of the vehicle is equal to or greater than a critical distance.

In this case, the critical distance may be expressed by a sum of the predetermined minimum spaced distance and |d−b|.

That is, when a≥minimum spaced distance+|d−b|, the control to secure a spare space may be performed, and the controller 200 may control the subject vehicle so that the distance between the vehicle and the passenger seat side vehicle is the reference distance. At this time, a distance control amount corresponds to d−b.

FIG. 11 is a diagram for explaining adjustment of a spaced distance at the time of automatic parking according to a second embodiment of the present disclosure.

Referring to FIG. 11, if the extracted passenger side distance b is smaller than the reference distance when the subject vehicle enters the optimal parking area, it is determined that the space is not sufficient and if the driver's seat side distance a is not enough to meet the reference distance d after the parking space with respect to the passenger seat side distance b is secured, the control to secure the minimum spaced distance is performed.

That is, as in the present embodiment, the conditions under which the control to secure the minimum spaced distance is performed are that the spaced distance between the subject vehicle and the passenger side vehicle is smaller than the reference distance (b<d) and the spaced distance between the vehicle and the passenger side vehicle is adjusted to be reference distance and then the spaced distance between the subject vehicle and the driver's seat side vehicle positioned on the driver's side of the subject vehicle is less than the critical distance.

In this case, the critical distance may be expressed by the sum of the predetermined minimum spaced distance and |d−b|.

That is, when a<minimum spaced distance+|d−b|, the control to secure the minimum spaced distance may be performed, and the controller 200 may control the subject vehicle so that the distance between the subject vehicle and the passenger seat side vehicle is the predetermined minimum spaced distance. At this point, the minimum spaced distance may be set to be a distance from a parking line between the subject vehicle and the driver's seat side vehicle to the subject vehicle or may be set to any value, and the distance control amount to which the vehicle moves corresponds to a-c.

According to the exemplary embodiment of the present disclosure, it is possible to provide the automatic parking system capable of setting an optimal parking area among parking areas to automatically perform parking from a current position of a subject vehicle to the optimal parking area.

According to the exemplary embodiment of the present disclosure, a driver may confirm a range in which a vehicle may drive at the time of parking at a glance by providing information on a range allowing generation of a moving path based on an optimal parking area at the time of automatic vehicle parking, and a range of a moving path of each available parking type according to a length, a width, a rotation angle, and the like of the vehicle within the range allowing generation of a moving path, through the screen, thereby relieving driver's anxiety about collision with surrounding vehicles. Further, the driver may confirm information on a stop timing and a shift timing through the screen in real time at the time of parking assistance, thereby increasing convenience at the time of parking.

According to the embodiment of the present disclosure, it is possible to make a driver conveniently get into and out of subject vehicle and surrounding vehicles by controlling the spaced distance from the surrounding vehicles parked on both sides of the subject vehicle when the automatic parking system is performed.

According to the embodiment of the present disclosure, it is possible to readjust the spaced distance between the subject vehicle and the surrounding vehicles if it is determined that the drivers of the surrounding vehicles may not easily get into and out of vehicles based on the detected parking condition.

Meanwhile, it is to be understood that a partially automated parking system is described in the present specification by way of example for convenience of explanation. As described above, the PAPS is merely one of several advanced driving assistance system (ADAS) functions, and it is to be understood that implementation of the PAPS suggested in the present disclosure may also be used for implementation of other relevant ADAS functions. For example, the method suggested in the present disclosure may also be used to implement one function or a combination of a plurality of functions ADAS functions such as a PAPS, a land departure warning system (LDWS), a lane keeping assistance system (LKAS), a pedestrian detection and collision mitigation system (PDCMS), a forward vehicle collision warning system (FVCWS), a low speed following (LSF), a maneuvring aids for low speed operation (MALSO) and an extended range backing aid (ERBA), etc.

In one or more exemplary embodiment of the present disclosure, the described functions may be implemented by hardware, software, firmware, or a combination thereof. In a case of implementation as software, the functions may be stored in or transmitted to a computer-readable medium as one or more commands or codes. The computer-readable medium includes all communication medium and computer storage medium including any medium facilitating transmission of a computer program from one place to another place. The storage medium may be any available medium that is accessible by a computer. As a non-limitative example, the computer-readable medium may include a RAM, a ROM, an EEPROM, a CD-ROM, or other optical disc storage, a magnetic disc storage or other magnetic storage device, or any other medium that may be used to transfer or store a desired program code in a form of a command or a data structure and is accessible by a computer. Further, an arbitrary connection is appropriately referred to as a computer-readable medium. For example, when software is transmitted from a website, a server, or other remote source by using a coaxial cable, an optical fiber cable, a twisted-pair cable, a digital subscriber line (DSL), or wireless technologies such as infrared, radio, and ultra high frequency, the coaxial cable, the optical fiber cable, the twisted-pair cable, the DSL, or the wireless technologies such as infrared, radio, and ultra high frequency are included in definition of the medium. The disk and disc as used herein includes a compact disc, a laser disc, an optical disc, a digital versatile disc (DVD), a floppy disc, and a Blu-ray disc, and disks generally magnetically reproduce data, but discs optically reproduces data by laser. The above combinations also should be included in a range of the computer-readable medium.

When the exemplary embodiments are implemented by a program code or code segments, it is to be recognized that the code segment may represent a procedure, a function, a sub-program, a program, a routine, a sub-routine, a module, a software package, a class, or any combination of commands, data structures, or program instructions. The code segment may be connected to another code segment or a hardware circuit by transferring and/or receiving information, data, an argument, a parameter, or memory contents. The information, the argument, the parameter, the data, and the like may be transferred, sent, or transmitted by using any appropriate means including memory share, message transmission, token transmission, network transmission, etc. In addition, in some aspects, steps and/or operations of a method or an algorithm may reside as one of codes and/or commands or any combination or a set thereof on a machine-readable medium and/or a computer-readable medium that may be integrated as a computer program object.

In the implementation as software, technologies described herein may be implemented by modules (e.g., procedure, function, etc.) performing the functions described herein. The software codes may be stored in memory units and may be executed by processors. A memory unit may be implemented in a processor or outside the processor, and in this case, the memory unit may be connected to the processor in a manner that the memory unit may perform communication with the processor by various means as known in the art.

In implementation as hardware, processing units may be implemented by one or more of an application specific integrated chip (ASIC), a digital signal processor (DSP), a digital signal processing device (DSPD), a programmable logic device (PLD), a field programmable gate array (FPGA), a processor, a controller, a microcontroller, a microprocessor, and other electronic units designed to perform the functions described herein, or in a combination thereof.

The above description includes an example of one or more exemplary embodiments. It is apparent that those skilled in the art may recognize that every possible combinations of components or method may not be described for explanation of the above described exemplary embodiments, but additional combination and substitution of various exemplary embodiments may be possible. Therefore, the described exemplary embodiments include all alternatives, changes, and modifications within the spirit and scope of the accompanying claims. Furthermore, regarding a range in which a term "comprising" is used in the detailed description or claims, the term is included similarly to a term "be configured" as interpreted when the term "be configured" is used as a transitional word in the claims.

As used herein, a term "inferring" or "inference" generally refers to a process of determining or inferring a state of a system, an environment, and/or a user based on observation of one set captured by events and/or data. The inference may be used to identify a specific situation or operation, or may generate probability distribution with respect to, for example, states. The inference may be probabilistic, that is, may be calculation of probability distribution with respect to corresponding states based on consideration of data and events. The inference may also refer to technologies used to configure upper level events from one set of events and/or data. Such inference enables estimation of new events or operations from one set of observed events and/or stored event data, whether events are closely related in time, and whether events and data come from one or several events and data sources.

Furthermore, as used in the present application, terms "component", "module", "system", and the like include, but not limited to, hardware, firmware, a combination of hardware and software, software, or a computer-related entity such as software being executed. For example, a component may be, not limited to, a process performed on a processor, a processor, an object, executable execution thread, a program, and/or a computer. For example, both of an application driven by an operational device and the operational device may be a component. One or more components may reside in a process and/or execution thread, and a component may be concentrated on one computer, and/or dispersed between two or more computers. Further, these components may be executed from various computer-readable medium storing various data structures. Components may perform communication by a local and/or remote process such as according to a signal having one or more data packets (for example, data from any component interacting with other components of a local system and distribution system and/or other systems by a signal through a network like Internet).

What is claimed is:

1. An automatic parking system, comprising:
    a sensor system measuring whether there is a parking section line and positions of surrounding vehicles; and
    a controller configured to:
        analyze data sensed by the sensor system to calculate parking areas around a subject vehicle;
        calculate a range allowing generation of a moving path based on the parking areas;
        determine at least two parking types available at a current position of the subject vehicle in the range allowing generation of a moving path, and provide moving path ranges for the at least two parking types based on a moving path estimated for each parking type, a length of the subject vehicle, a width of the subject vehicle, and a rotation angle of the subject vehicle;
        provide a moving path range for a parking type that is selected among the moving path ranges provided for the at least two parking types, and an optimal parking area for the selected moving path range; and
        automatically park the subject vehicle in the optimal parking area,
    wherein the sensor system senses spaced distances between the surrounding vehicles positioned at a side of the subject vehicle in the optimal parking area,
    the controller compares a predetermined reference distance with the spaced distances to control the subject vehicle,
    a length of the optimal parking area is a value obtained by adding a first room value to the length of the subject vehicle, a width of the optimal parking area is a value obtained by adding a second room value to the width of the subject vehicle,
    the first room value is calculated based on the length of the subject vehicle, and the second room value is calculated based on the width of the subject vehicle, and
    the first and second room values are determined to be different depending on the length and width of the subject vehicle, respectively.

2. The automatic parking system of claim 1, wherein the parking types are at least two of front end parking, back-in parking, parallel parking, and diagonal parking.

3. The automatic parking system of claim 1, wherein the sensor system includes:
    a first sensor sensing presence or absence of the parking section line, and positions of surrounding vehicles; and
    a second sensor sensing a spaced distance between the subject vehicle and the surrounding vehicles, and
    the controller calculates a range allowing generation of a moving path based on the spaced distance when the parking section line is not recognized around the subject vehicle.

4. The automatic parking system of claim 1, wherein the controller controls the subject vehicle so that a first spaced distance from a passenger seat side vehicle positioned on a passenger seat side of the subject vehicle is adjusted to be the predetermined reference distance based on the space distances.

5. The automatic parking system of claim 4, wherein the controller adjusts the first spaced distance to be the reference distance when the first spaced distance is smaller than the reference distance and then determines whether a second spaced distance between the subject vehicle and a driver's seat side vehicle positioned on the driver's seat of the subject vehicle is equal to or greater than the reference distance.

6. The automatic parking system of claim 5, wherein the controller controls the subject vehicle so that the second spaced distance is the reference distance when the second spaced distance is equal to or greater than the reference distance.

7. The automatic parking system of claim 5, wherein the controller controls the subject vehicle so that the second spaced distance is a predetermined minimum spaced distance when the second spaced distance is less than the reference distance.

8. The automatic parking system of claim 7, wherein the minimum spaced distance is set to be a distance between a main lane positioned between the subject vehicle and the driver's seat side vehicle and the subject vehicle.

9. The automatic parking system of claim 4, wherein the controller determines whether a second spaced distance between the subject vehicle and a driver's seat side vehicle positioned on the driver's seat side of the subject vehicle is equal to or greater than a predetermined critical distance when the first spaced distance is smaller than the reference distance, and the critical distance is set to be a value obtained by adding a predetermined first spaced distance is adjusted to the reference distance.

10. The automatic parking system of claim 1, further comprising:
    a display controller informing a driver of the parking areas and moving paths corresponding to the parking areas,
    wherein the display controller transmits to the controller data on any one of the parking areas and the moving paths selected by the driver.

11. The automatic parking system of claim 1, wherein the controller controls steering, acceleration, brake, gear shift, and parking brake of the subject vehicle.

12. An automatic parking method for automatically parking a subject vehicle, the automatic parking method comprising steps of:
    setting, by a driver of the subject vehicle, an automatic parking mode;
    sensing, by a sensor system, presence or absence of a parking section line around the subject vehicle, and positions of surrounding vehicles;

analyzing, by a controller, the presence or absence of the parking section line and the positions of the surrounding vehicles to calculate parking areas around the subject vehicle;

calculating, by the controller, a range allowing generation of a moving path based on the parking areas;

determining, by the controller, at least two parking types available at a current position of the subject vehicle in the range allowing generation of a moving path and providing moving path ranges for the at least two parking types based on a moving path estimated for each parking type, a length of the subject vehicle, a width of the subject vehicle, and a rotation angle of the subject vehicle;

providing, by the controller, a moving path range for a parking type that is selected among the moving path ranges provided for the at least two parking types, and an optimal parking area for the selected moving path range; and automatically parking, by the controller, the subject vehicle in the optimal parking area, wherein the subject vehicle is controlled by sensing spaced distances between the subject vehicle and the surrounding vehicles in the optimal parking area, a length of the optimal parking area is a value obtained by adding a first room value to the length of the subject vehicle, a width of the optimal parking area is a value obtained by adding a second room value to the width of the subject vehicle, the first room value is calculated based on the length of the subject vehicle, and the second room value is calculated based on the width of the subject vehicle, and the first and second room values are determined to be different depending on the length and width of the subject vehicle, respectively.

13. The automatic parking method of claim 12, further comprising a step of:

after the step of automatically parking the subject vehicle, terminating the automatic parking mode, wherein the step of terminating the automatic parking mode is performed by turning off an automatic parking mode switch or shifting a gear to parking.

14. The automatic parking method of claim 12, wherein in the step of automatically parking the subject vehicle, when an automatic parking mode switch is turned off or a gear is shifted to parking, the automatic parking mode is terminated.

15. The automatic parking method of claim 12, wherein in the step of automatically parking the subject vehicle, when any one of gear shift, steering change, and brake operation is performed, the automatic parking mode is stopped.

16. The automatic parking method of claim 12, wherein the spaced distances include a first spaced distance between the subject vehicle and a passenger seat side vehicle positioned on a passenger side of the subject vehicle and a second spaced distance between the subject vehicle and a driver's seat side vehicle positioned on the driver's seat of the subject vehicle, and in the step of automatically parking the subject vehicle, the subject vehicle is controlled so that the first spaced distance and the second spaced distance are adjusted to be a predetermined reference distance.

17. The automatic parking system of claim 1, wherein the first and second room values are proportional to the length and width of the subject vehicle, respectively.

18. The automatic parking method of claim 12, wherein the first and second room values are proportional to the length and width of the subject vehicle, respectively.

19. An automatic parking system, comprising:

a sensor system measuring whether there is a parking section line and positions of surrounding vehicles; and a controller configured to:

analyze data sensed by the sensor system to calculate parking areas around a subject vehicle;

calculate a range allowing generation of a moving path based on the parking areas;

determine at least two parking types available at a current position of the subject vehicle in the range allowing generation of a moving path, and simultaneously display, on a screen, moving path ranges for the at least two parking types, based on a moving path estimated for each parking type, a length of the subject vehicle, a width of the subject vehicle, and a rotation angle of the subject vehicle;

provide a moving path range for a parking type that is selected among the moving path ranges provided for the at least two parking types, and an optimal parking area for the selected moving path range; and automatically park the subject vehicle in the optimal parking area, wherein the sensor system senses spaced distances between the surrounding vehicles positioned at a side of the subject vehicle in the optimal parking area, and the controller compares a predetermined reference distance with the spaced distances to control the subject vehicle.

* * * * *